(12) United States Patent
Moon et al.

(10) Patent No.: US 6,839,114 B2
(45) Date of Patent: Jan. 4, 2005

(54) SUBSTRATE FOR IN-PLANE SWITCHING MODE LIQUID CRYSTAL DISPLAY DEVICE WITH CAPACITORS CONNECTED BY EXTENDING LINES AND METHOD FOR FABRICATING THE SAME

(75) Inventors: Hong-Man Moon, Gyeongsangbuk-do (KR); Sang-Choi Park, Gyeonhsangbuk-do (KR); Jae-Young Chung, Pusan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 136 days.

(21) Appl. No.: 10/025,902

(22) Filed: Dec. 26, 2001

(65) Prior Publication Data

US 2002/0093614 A1 Jul. 18, 2002

(30) Foreign Application Priority Data

Dec. 29, 2000 (KR) ........................................ 2000-85006

(51) Int. Cl.⁷ ............................................ G02F 1/1343
(52) U.S. Cl. ......................................... 349/141; 349/38
(58) Field of Search ................................ 349/114, 141, 349/38

(56) References Cited

U.S. PATENT DOCUMENTS

| | | | | |
|---|---|---|---|---|
| 5,598,285 A | | 1/1997 | Kondo et al. .................. | 349/39 |
| 5,745,207 A | * | 4/1998 | Asada et al. ................. | 349/141 |
| 5,838,037 A | | 11/1998 | Masutani et al. ........... | 257/296 |
| 5,946,060 A | | 8/1999 | Nishiki et al. ................ | 349/48 |
| 5,977,562 A | * | 11/1999 | Hirakata et al. .............. | 257/72 |
| 5,978,059 A | * | 11/1999 | Ohta et al. ................... | 349/141 |
| 5,990,987 A | | 11/1999 | Tanaka ......................... | 349/43 |
| 6,028,653 A | | 2/2000 | Nishida ....................... | 349/141 |
| 6,097,454 A | | 8/2000 | Zhang et al. ................. | 349/43 |

(List continued on next page.)

FOREIGN PATENT DOCUMENTS

| | | |
|---|---|---|
| JP | 09-005764 | 1/1997 |
| JP | 09-073101 | 3/1997 |

(List continued on next page.)

OTHER PUBLICATIONS

R. Kieler et al.; "In–Plane Switching of Nematic Liquid Crystals"; Japan Display '92; pp. 547–550.

(List continued on next page.)

*Primary Examiner*—Frank G. Font
*Assistant Examiner*—Timothy L Rude
(74) *Attorney, Agent, or Firm*—McKenna Long & Aldridge LLP (57) ABSTRACT

An array substrate for an in-plane switching liquid crystal display device includes a substrate, a gate line and a common line on the substrate, the gate and common lines disposed parallel to and spaced apart from each other, a gate insulator on the gate and common lines, and a data line substantially perpendicular to the gate and common lines on the gate insulator such that a pixel region defined by the gate and data lines. The pixel region is divided into first and second pixel region by the common line. A thin film transistor is adjacent to a crossing portion of the gate and data lines, the thin film transistor having a drain electrode. A first storage electrode is on the gate insulator over the common line, and the first storage electrode connected to the drain electrode. A second storage electrode is on the gate insulator over the gate line, and the second storage electrode connected to the first storage electrode. A common electrode is connected to the common line and has a plurality of extended portions at the first pixel region perpendicular to the common line. A first pixel electrode at the first pixel region is connected to the drain electrode and has a plurality of extended portions perpendicular to the common line. The plurality of extended portions of first pixel electrode alternate with the plurality of extended portions of common electrode.

13 Claims, 8 Drawing Sheets

U.S. PATENT DOCUMENTS

| | | | |
|---|---|---|---|
| 6,288,763 B1 * | 9/2001 | Hirota | 349/141 |
| 6,300,995 B1 * | 10/2001 | Wakagi et al. | 349/141 |
| 6,486,934 B2 * | 11/2002 | Yun et al. | 349/141 |
| 6,507,383 B1 * | 1/2003 | Abe et al. | 349/141 |
| 2002/0044249 A1 * | 4/2002 | Hirota | 349/146 |
| 2003/0063074 A1 * | 4/2003 | Kumagawa et al. | 345/204 |

FOREIGN PATENT DOCUMENTS

| | | |
|---|---|---|
| JP | 09-101538 | 4/1997 |
| JP | 09-105908 | 4/1997 |
| KR | 10-0218527 | 6/1999 |
| KR | 10-0250972 | 12/2000 |

OTHER PUBLICATIONS

M. Oh–e, et al.; "Principles and Characteristics of Electro–Optical Behaviour with In–Plane Switching Mode"; Asis Display '95; pp. 557–580.

M. Ohta et al.; "Development of Super–TFT–LCDs with In–Plane Switching Display Mode"; Asia Display '95; pp. 707–710.

S. Matsumoto et al.; Display Characteristics of In–Plane Switching (IPS) LCDs and a Wide–Viewing–Angle 14.5–in. OPS TFT–LCD; Euro Display '96; pp. 445–448.

H. Wakemoto et al.; "An Advanced In–Plane Switching Mode TFT–LCD"; SID 97 Digest; pp. 929–932.

S.H. Lee et al.; High–Transmittance, Wide–Viewing–Angle Nematic Liquid Crystal Display Controlled by Fringe–Field Switching; Asia Display '98; pp. 371–374.

* cited by examiner

*(prior art)*

*FIG. 1*

*(prior art)*

FIG. 2

*(prior art)*

FIG. 3A

*(prior art)*

FIG. 3B on state

*(prior art)*

FIG. 3C

*(prior art)*

FIG. 3D

*(prior art)*

SUBSTRATE FOR IN-PLANE SWITCHING MODE LIQUID CRYSTAL DISPLAY DEVICE WITH CAPACITORS CONNECTED BY EXTENDING LINES AND METHOD FOR FABRICATING THE SAME

This application claims the benefit of Korean Patent Applications No. 2000-85006, filed on Dec. 29, 2000, which is hereby incorporated by reference as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

A conventional liquid crystal display (LCD) device uses optical anisotropy and polarization properties of liquid crystal molecules. The liquid crystal molecules have a definite orientational order in alignment resulting from their thin and long shapes. The alignment direction of the liquid crystal molecules can be controlled by applying an electric field to the liquid crystal molecules. In other words, as the alignment direction of the electric field is changed, the alignment of the liquid crystal molecules also changes. Since the incident light is refracted to the orientation of the liquid crystal molecules due to the optical anisotropy of the aligned liquid crystal molecules, images are displayed.

Of the different types of known LCDs, active matrix LCDs (AM-LCDs), which have thin film transistors and pixel electrodes arranged in a matrix form, are the subject of significant research and development because of their high resolution and superiority in displaying moving images. Driving methods for such LCDs typically include a twisted nematic (TN) mode and a super twisted nematic (STN) mode.

Figure 1:
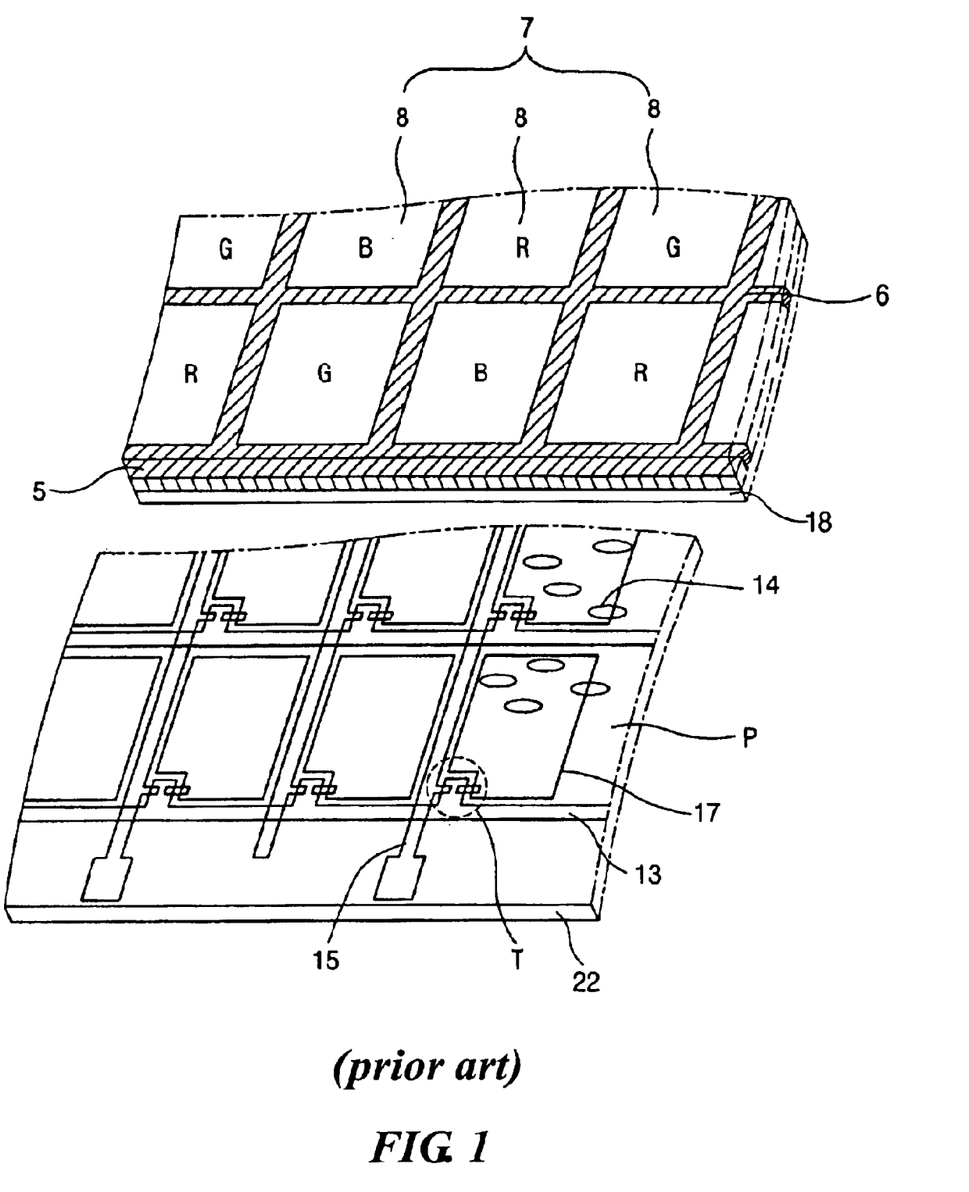
FIG. 1 is a schematic perspective view of a conventional liquid crystal display device.

FIG. 1 is a schematic perspective view of a conventional liquid crystal display device.

In FIG. 1, the conventional LCD device is composed of upper and lower substrates 5 and 22. A black matrix 6, a color filter 7, which includes sub-color filters (red, green, blue) 8, and a transparent common electrode 18, which is disposed above the color filter 7, are formed on the upper substrate 5. A pixel region "P", a pixel electrode 17, which is disposed at the pixel region "P", and an array line, which includes a switching device "T", are formed on the lower substrate 22. A liquid crystal layer 14 is interposed between the upper and lower substrates 5 and 22. The black matrix 6 is formed by deposition and patterning of an opaque metallic material having a low reflectance or by coating and patterning an opaque photosensitive resin.

The lower substrate 22 is commonly referred to as an array substrate, where thin film transistors "T" are arranged in a matrix configuration and are located where gate and data lines 13 and 15 cross. The pixel region "P" is defined by the gate and data lines 13 and 15, and a transparent conductive metal like indium-tin-oxide (ITO), for example, whose transmittance is relatively high, is used as pixel electrode 17 on the pixel region "P".

If a voltage is applied to the common electrode 18 of the upper substrate 5 and the pixel electrode 17 of the lower substrate 22, transmittance of the LCD device is changed according to an alignment state of the liquid crystal layer 14 so that images can be displayed.

The conventional LCD device having the above-mentioned structure, in which the liquid crystal layer is driven by the electric field perpendicular to the upper and lower substrates, has a high transmittance and a high aperture ratio. The common electrode of the upper substrate is grounded so that damage to the device due to the static electricity is prevented. However, the viewing angle of the conventional LCD device having the above-mentioned structure is narrow. Therefore, to overcome the drawback, new technologies are suggested. An in-plane switching (IPS) LCD device is one of the most researched new technologies. A detailed explanation about operation modes of a conventional IPS-LCD device will be provided with reference to FIGS. 2 to 3D.

Figure 2:
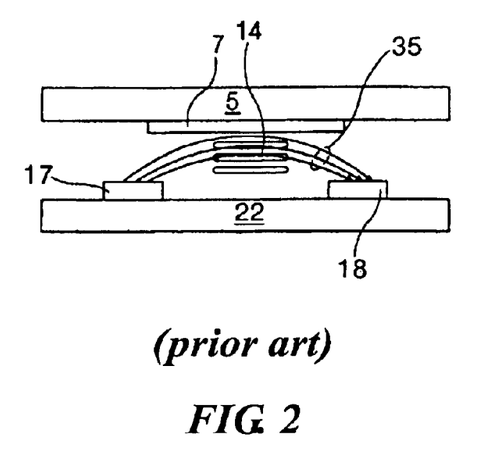
FIG. 2 is a schematic cross-sectional view of a conventional in-plane switching liquid crystal display device.

FIG. 2 is a schematic cross-sectional view of a conventional IPS-LCD device.

In FIG. 2, upper and lower substrates 5 and 22 are spaced apart from each other, and a liquid crystal layer 14 is interposed therebetween. Both pixel and common electrodes 17 and 18 are disposed on the lower substrate 22. A color filter 7 is disposed on a surface of the upper substrate 5 and opposes the lower substrate 22. The pixel and common electrodes 17 and 18 apply an electric field 35 to the liquid crystal, in which the electric field 35 is parallel to the upper and lower substrates 5 and 22.

FIGS. 3A to 3D are schematic views conceptually showing operation modes of a conventional IPS-LCD device.

Figure 3A:
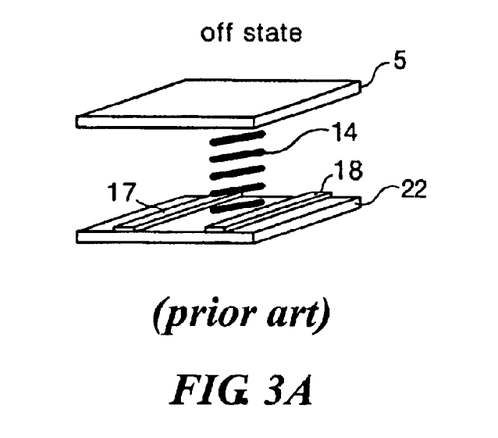
FIGS. 3A to 3D are schematic views conceptually showing operation modes of a conventional in-plane switching liquid crystal display device.
Figure 3B:
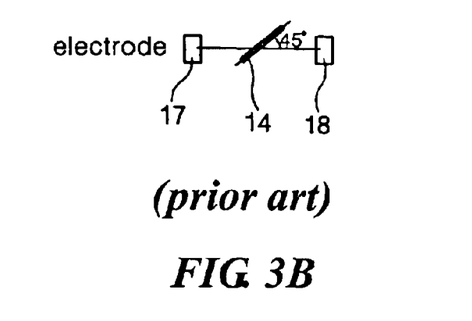

FIGS. 3A and 3B show the off-state of the IPS-LCD device. In the off-state there is no electric field between the pixel and the common electrodes 17 and 18, and the phase transition of the liquid crystal layer 14 does not occur. For example, the liquid crystal layer 14 has an angle of 45 degrees between the long axis and the direction parallel to upper and lower substrates 5 and 22.

Figure 3C:
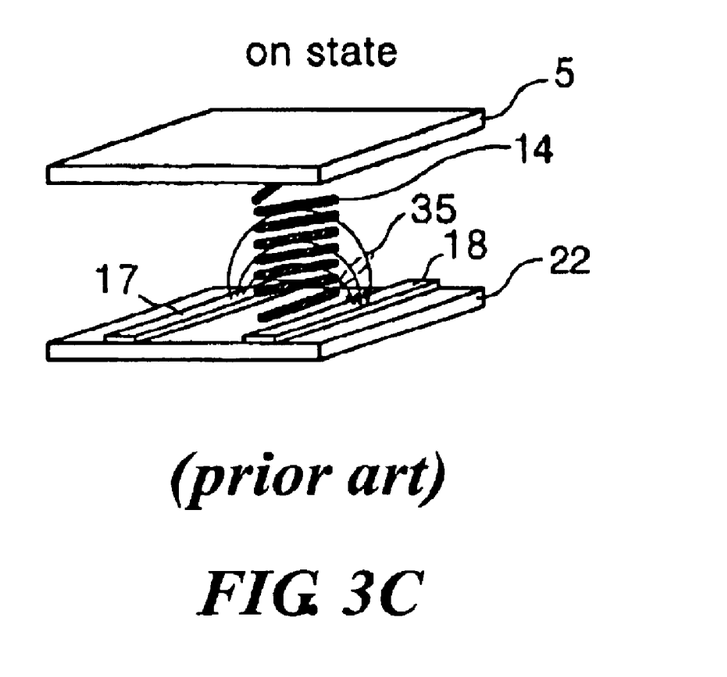
Figure 3D:
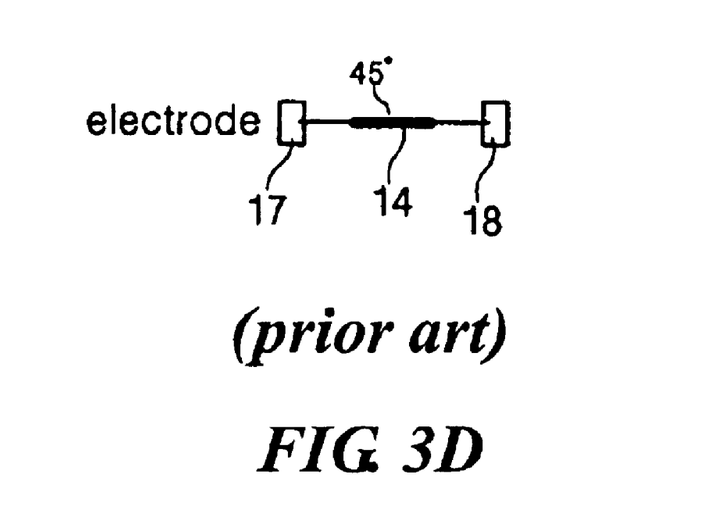

FIGS. 3C and 3D show the on-state, in which a voltage is applied to the pixel and common electrodes 17 and 18 so that an electric field 35 parallel to the upper and lower substrates 5 and 22 is generated, and the phase transition of the liquid crystal layer 14 occurs. The liquid crystal layer 14 is twisted so as to have an twist angle of 45 degrees with respect to the off-state of FIGS. 3A and 3B and aligned to the generated electric field 35.

By the above-mentioned operation modes and with additional parts such as polarizers and alignment layers, the IPS-LCD device displays images. The IPS-LCD device has a wide viewing angle and low color dispersion characteristic. Specifically, the viewing angle of the IPS-LCD device is about 85 degrees in direction of up, down, right, and left. In addition, the fabricating processes of this IPS-LCD device are simpler than other various LCD devices.

However, because the pixel and common electrodes 17 and 18 are disposed on the same plane on the lower substrate, the transmittance and aperture ratio are low. In addition, response time according to a driving voltage should be improved and a cell gap should be uniform because of the low alignment margin.

Therefore, the IPS-LCD device can be adopted considering the advantages and the disadvantages.

Figure 4:
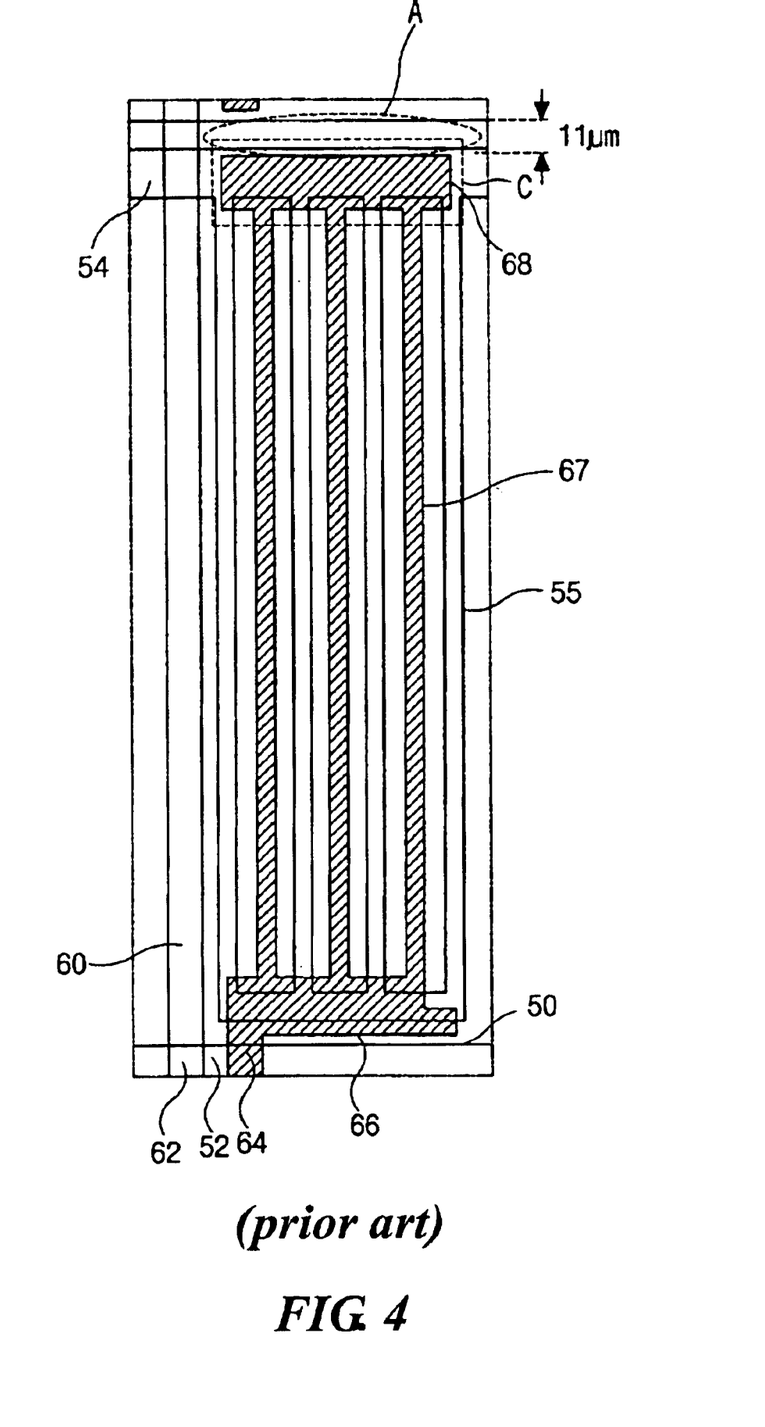
FIG. 4 is schematic plan view of an array substrate for a conventional in-plane switching liquid crystal display device.

FIG. 4 is a schematic plan view of an array substrate for a conventional IPS-LCD device.

In FIG. 4, row gate and common lines 50 and 54 are disposed parallel to each other and a column data line 60 is disposed perpendicular to the row gate and common lines 50 and 54. Moreover, a gate electrode 52 is formed at a specific portion of the gate line 50. A source electrode 62 is formed at a portion adjacent to the gate electrode 52 on the data line 60 and overlapping the gate electrode 52. A drain electrode 64 is formed at a portion corresponding to the source electrode 62 with a specific distance between the source electrode 62 and the drain electrode 64. Furthermore, in a pixel region defined by the gate and data lines 50 and 60, a plurality of common electrodes 55 extending from the common line 54, a first pixel line 66 extending from the drain electrode 64, a plurality of pixel electrodes 67 extending from the first pixel line 66 and a second pixel line 68 connecting the plurality of pixel electrodes 67 are formed. The common and pixel electrodes 55 and 67 are disposed parallel and alternating to each other. A storage capacitor "C" is formed on a specific region of the common line 54 by using the common line 54 and the second pixel line 68 as first and second electrodes of the storage capacitor C.

In the conventional IPS-LCD device having the above-mentioned structure, since the common line adjacent to the gate line is formed of the same material and in the same layer as the gate line, the gate and common lines can be electrically connected by a fabrication error. To prevent this problem, the gate and common lines should have a specific distance. However, since the liquid crystal layer of the area "A" on the distance between the gate and common lines cannot be operated normally, the aperture ratio is remarkably decreased. Moreover, since the voltage difference between the gate and common lines always exists, the reliability of the IPS-LCD device is also decreased.

SUMMARY OF THE INVENTION

Accordingly, the present invention is directed to an in-plane switching liquid crystal display device and manufacturing method thereof that substantially obviates one or more of problems due to limitations and disadvantages of the related art.

An advantage of the present invention is to provide an in-plane switching liquid crystal display device that has a structure of preventing a short between the gate and common lines and improving an aperture ratio and a manufacturing method thereof.

Another advantage of the present invention is to provide an in-plane switching liquid crystal display device that has low color shift by adopting multi-domain structure and a manufacturing method thereof.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching liquid crystal display device includes a substrate, a gate line and a common line on the substrate, the gate and common lines disposed parallel to and spaced apart from each other, a gate insulator on the gate and common lines, a data line perpendicular to the gate and common lines on the gate insulator, a pixel region defined by the gate and data lines, the pixel region divided into first and second pixel region by the common line, a thin film transistor adjacent to a crossing portion of the gate and data lines, the thin film transistor having a drain electrode, a first storage electrode on the gate insulator over the common line, the first storage electrode connected to the drain electrode, a second storage electrode on the gate insulator over the gate line, the second storage electrode connected to the first storage electrode, a common electrode connected to the common line and having a plurality of extended portions at the first pixel region perpendicular to the common line and a first pixel electrode at the first pixel region connected to the drain electrode and having a plurality of extended portions perpendicular to the common line, the plurality of extended portions of first pixel electrode alternated with the plurality of extended portions of common electrode.

In another aspect of the present invention, a method of fabricating an array substrate for an in-plane switching liquid crystal display device includes forming a substrate, forming a gate line and a common line on the substrate, the gate and common lines disposed parallel to and spaced apart from each other, forming a gate insulator on the gate and common lines, forming a data line perpendicular to the gate and common lines on the gate insulator, a pixel region defined by the gate and data lines and divided into first and second pixel region by the common line, forming a thin film transistor adjacent to a crossing portion of the gate and data lines, the thin film transistor having a drain electrode, forming a first storage electrode on the gate insulator over the common line, the first storage electrode connected to the drain electrode, forming a second storage electrode on the gate insulator over the gate line, the second storage electrode connected to the first storage electrode, forming a common electrode connected to the common line and having a plurality of extended portions at the first pixel region perpendicular to the common line and forming a first pixel electrode at the first pixel region connected to the drain electrode and having a plurality of extended portions perpendicular to the common line, the plurality of extended portions of first pixel electrode alternated with the plurality of extended portions of common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 5:
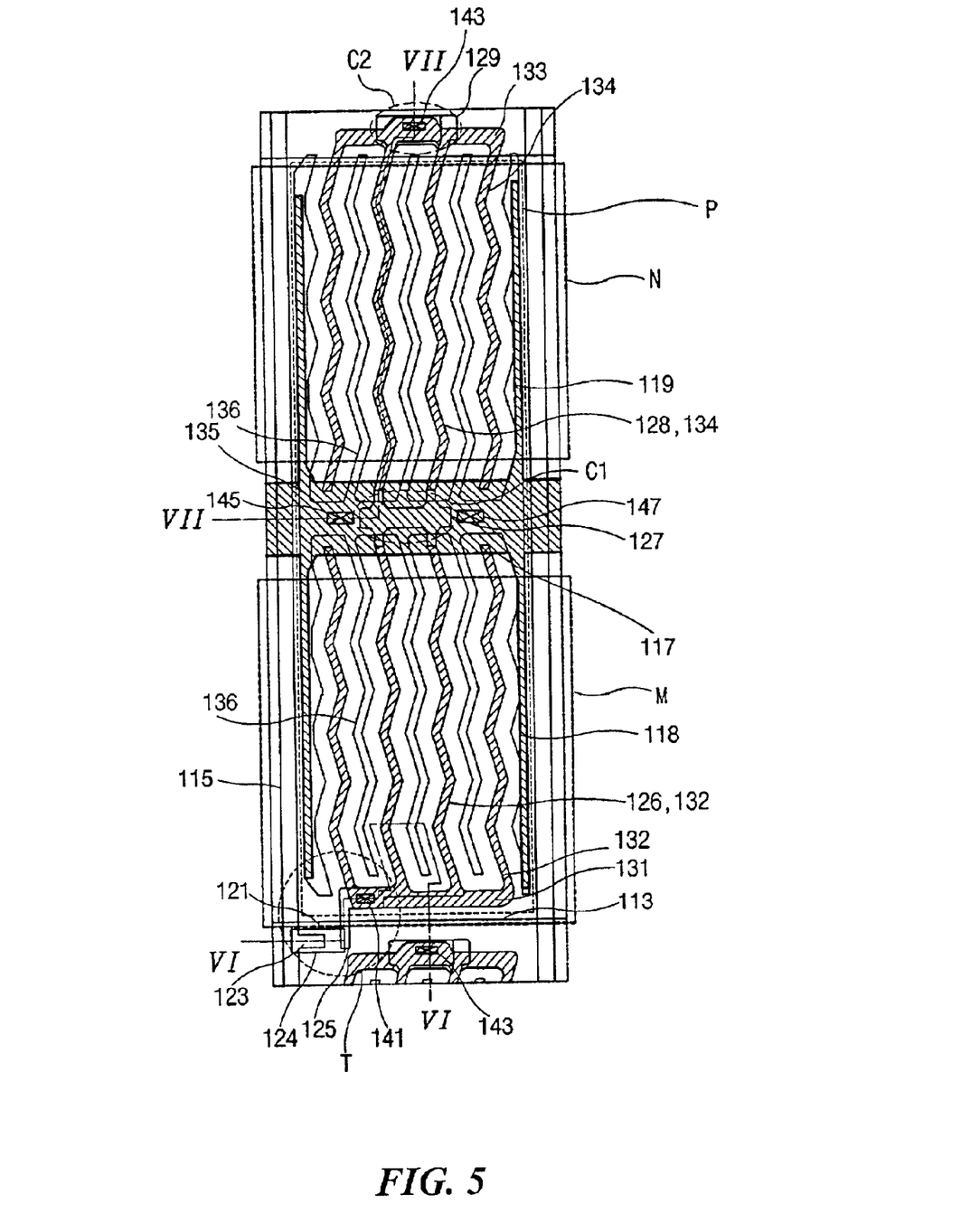
FIG. 5 is schematic plan view of an array substrate for an in-plane switching liquid crystal display device according to the present invention.

FIG. 5 is a schematic plan view of an array substrate for an IPS-LCD device according to an embodiment.

In FIG. 5, a pixel region "P" is defined by a row gate line 113 and a column data line 115. A TFT "T" having a gate electrode 121, an active layer 124, a source electrode 123 and a drain electrode 125 is disposed adjacent to a crossing portion of the gate and data lines 113 and 115. A common line 117 of the same material as the gate line 113 is disposed at the pixel region "P" parallel to the gate line 113. Here, the common line 117 is spaced apart from the gate line 113 and is disposed in the middle of the (n)-th and (n–1)-th gate lines so that the electrical shortage between the common and gate lines 117 and 113 cannot occur. Moreover, the common line 117 has a plurality of extended portions 118 and 119 at the boundary of the pixel region "P", which are elongated nearly perpendicular to the common line 117 and disposed adjacent to the data line 115 as a auxiliary black matrix so that the light leakage between the data line 115 and an extended portion 136 of a common electrode 135 can be prevented.

A first storage electrode 127 and a second storage electrode 129 are disposed over the common line 117 and the gate line 113, respectively. The first and second storage electrodes 127 and 129 are connected to the drain electrode 125 through extended lines 126 and 128 so that first and second storage capacitors "C1" and "C2" are formed between the common line 117 and the first storage electrode 127 and between the gate line 113 and the second storage electrode 129, respectively.

Since the common line 117 is disposed in the middle of the pixel region "P", the pixel region "P" can be divided into first and second regions "M" and "N". A plurality of extended portions 136 of a common electrode 135 and a plurality of extended portions 132 and 134 of first and second pixel electrodes 131 and 133 are disposed alternately at the first and second regions "M" and "N". The common electrode 135 is connected to the common line 117 through contact holes 145 and 147 and the plurality of extended portions 136 have a substantially zigzag shape and extend nearly perpendicular to the common electrode 135. The first and second pixel electrodes 131 and 133 and their extended portions 132 and 134 are independently disposed at the first and second regions "M" and "N", respectively. The first pixel electrode 131 of the first region "M" is connected to the drain electrode 125 and the plurality of extended portions 132 have a substantially zigzag shape and extend nearly perpendicular to the first pixel electrode 131. The second pixel electrode 133 of the second region "N" is connected to the second storage electrode 129 and the plurality of extended portions 134 have a substantially zigzag shape and extend nearly perpendicular to the second pixel electrode 133. Therefore, the independent first and second pixel electrodes 131 and 133 are connected to the drain electrode 125 and the signal of the data line 115 can be transferred.

FIGS. 6A to 6C and 7A to 7C are sequential cross-sectional views taken along lines "VI—VI" and "VII—VII" of FIG. 5, respectively.

Figure 6A:
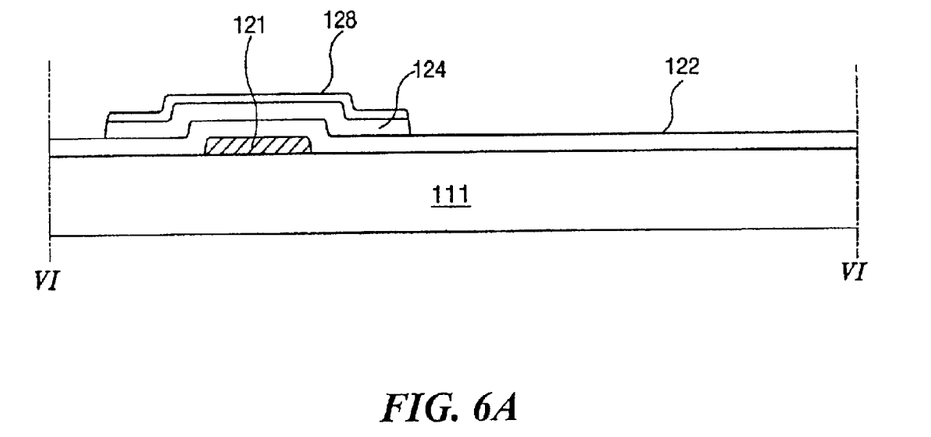
FIGS. 6A and 6C are sequential cross-sectional views taken along a line "VI—VI" of FIG. 5.
Figure 7A:
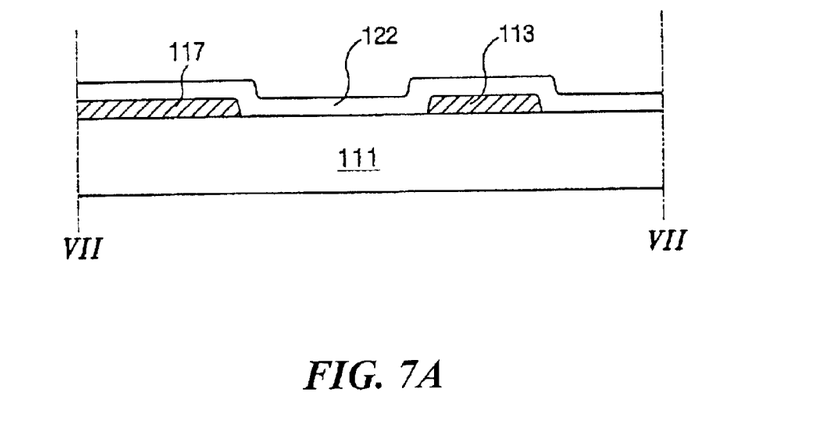
FIGS. 7A to 7C are sequential cross-sectional views taken along a line "VII—VII" of FIG. 5.

In FIGS. 6A and 7A, a gate line 113, a gate electrode 121, a common line 117 and a plurality of extended portions 118 and 119 (of FIG. 5) of the common line 117 are formed on a substrate 111 by depositing and patterning one of conductive materials such as aluminum (Al), aluminum alloy, chromium (Cr), molybdenum (Mo) and tungsten (W). Then, a gate insulator 122 of inorganic materials such as silicon nitride (SiNx) and silicon oxide (SiO$_2$) or organic materials such as bezocyclobutene (BCB) and acrylic resin is formed on the entire surface of the substrate 111. An active layer 124 of intrinsic amorphous silicon (a-Si:H) and an ohmic contact layer 128 of doped amorphous silicon (n+ or p+ a-Si:H) are subsequently formed on the gate insulator 122 over the gate electrode 121. The ohmic contact layer 128 can be formed by thinly doping n+ or p+ ions onto the active layer 124.

Figure 6B:
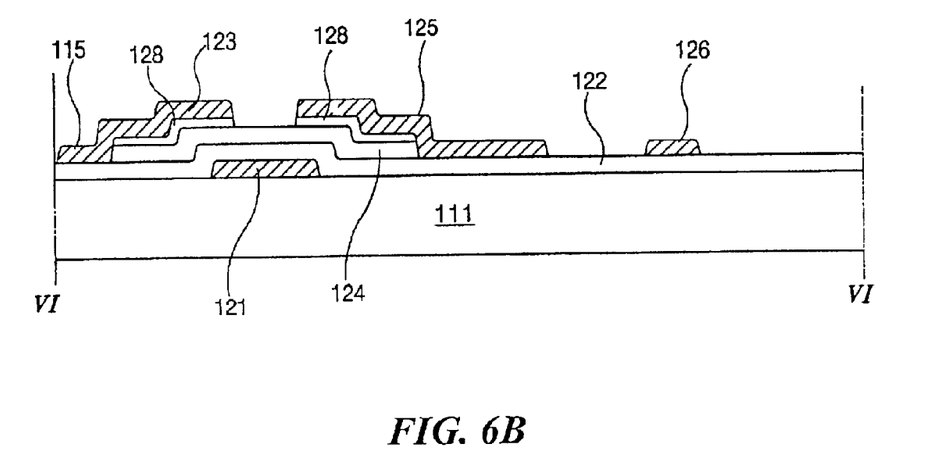
Figure 7B:
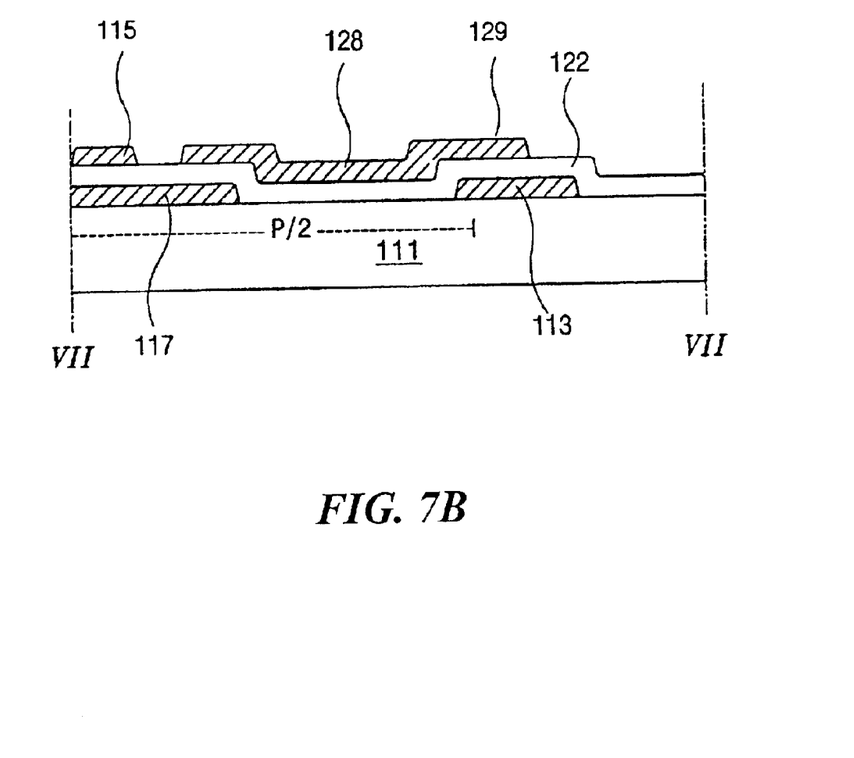

In FIGS. 6B and 7B, a data line 115, a source electrode 123 and a drain electrode 125 are formed by depositing and patterning one of conductive materials such as aluminum (Al), aluminum alloy, chromium (Cr), molybdenum (Mo) and tungsten (W). The source and drain electrodes 123 and 125 contact the ohmic contact layer 128 and are spaced apart from each other. The source electrode 123 extends from the crossing portion of the data line 115 with the gate line 113. A first storage electrode 127 (not shown) and a second storage electrode 129 are formed on the gate insulator 122 over the common line 135 and the gate line 113 with specific areas, respectively. The first storage electrode 127 is connected to the drain electrode 125 through the first drain extended portions 126 at a first region "M" (of FIG. 5) and the second storage electrode 129 is connected to the first storage electrode 127 through the second drain extended portions 128 at a second region "N" (of FIG. 5). Therefore, the two storage capacitors are formed, i.e., a first storage capacitor "C1" between the common line 117 and the first storage electrode 127 and the second storage capacitor between the gate line 113 and the second storage electrode 129.

Figure 6C:
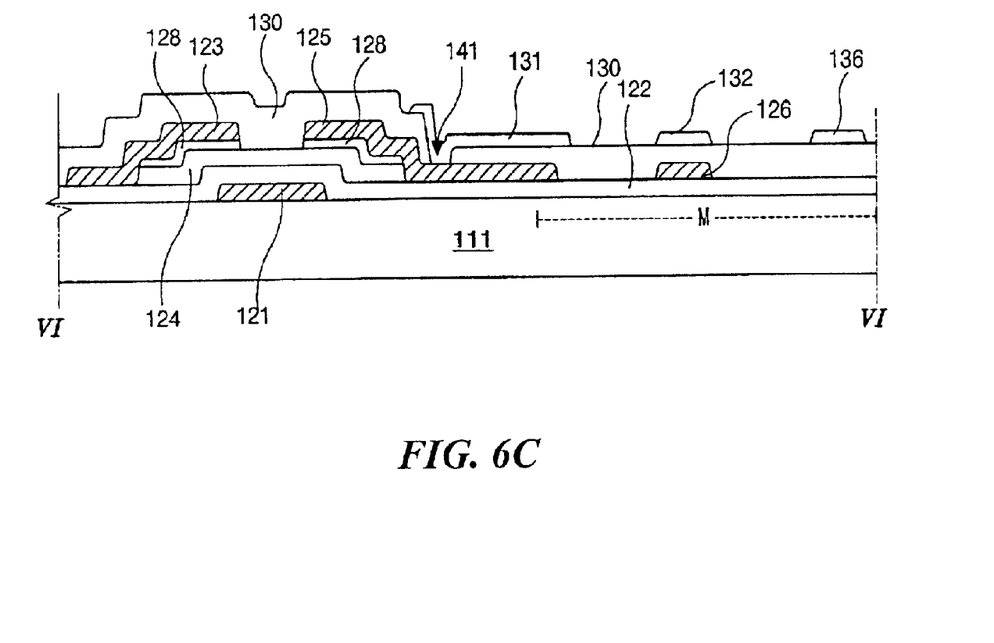
Figure 7C:
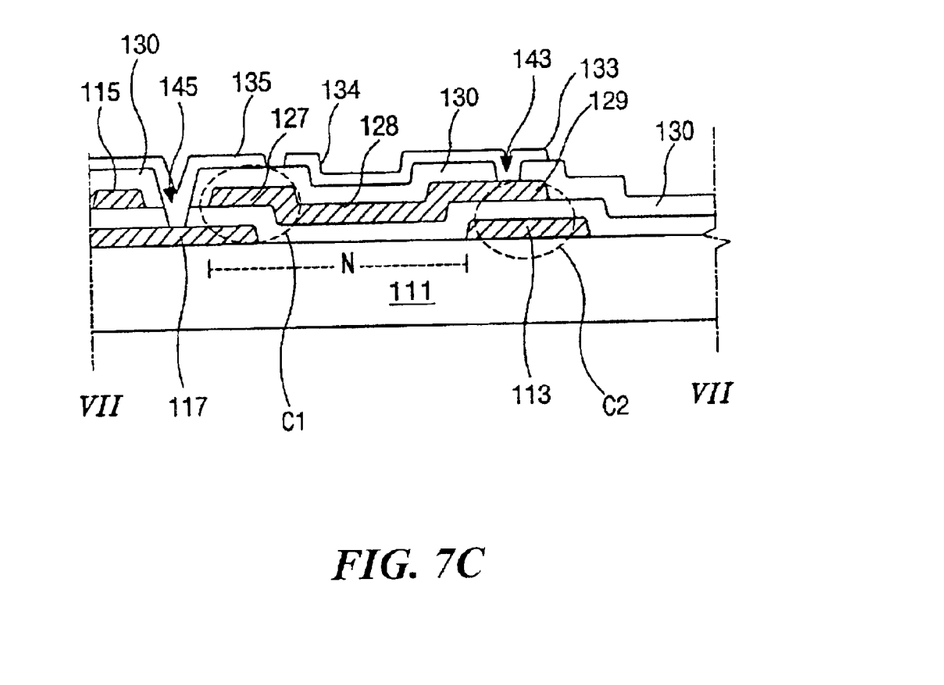

In FIGS. 6C and 7C, a passivation layer 130 is formed on the entire surface of the substrate 111 by depositing one of organic materials such as benzocyclobutene (BCB) and acrylic resin or inorganic materials such as silicon nitride (SiNx) and silicon oxide (SiO$_2$). Then, a first contact hole 141 exposing the drain electrode 125, a second contact hole 143 exposing the second storage electrode 129 and third and fourth contact holes 145 and 147 (of FIG. 5) exposing the common line 113 are formed. A common electrode 135 having a plurality of extended portions 136 is formed on the common line 113 and connected to the common line 113 through the third and forth contact holes 145 and 147 (of FIG. 5). Simultaneously, first and second pixel electrodes 131 and 133 of the same material as the common electrode 135 are formed at the first and second regions "M" and "N", respectively. The first pixel electrode 131 having a plurality of extended portions 132 is connected to the drain electrode 125 through the first contact hole 141 and the second pixel electrode 133 having a plurality of extended portions 134 is connected to the second storage electrode 129 through the second contact hole 143. Here, some of extended portions 132 and 134 are formed over the first and second drain extended portions 126 and 128. Even though the first and second pixel electrodes 131 and 133 are independently formed, the same data are transferred to the first and second pixel electrodes 131 and 133 due to the electric connection to the drain electrode 125.

Here, each of extended portions 132, 134 and 136 of the first and second pixel electrodes 131 and 133 and the common electrode 135 has a substantially zigzag shape.

There are several advantages in the array substrate of the IPS-LCD device according to the embodiment of the present invention.

First, since two storage capacitors are formed per one pixel, large storage capacitance can be adopted and high display quality or high-density display can be performed. Second, since the gate and common lines are spaced apart from each other or the common line is disposed in the middle of two adjacent gate lines, the electric short or leakage current between the gate and common lines can be prevented, and the reliability of the IPS-LCD device can be increased. Third, since the pixel and common electrodes have extended portions at first and second pixel regions, the non-display region between the gate and common lines of the related art can be eliminated, and the aperture ratio and the brightness can be increased. Fourth, since the common and pixel electrodes are simultaneously formed on the same layer with a uniform distance, the electric field distribution can be uniform, and flicker can be prevented. Fifth, since the common and pixel electrodes have a bent portion (i.e., have a substantially zigzag shape), the multi-domains can be realized, and the color shift can be decreased.

It will be apparent to those skilled in the art that various modifications and variation can be made in the method of manufacturing a flat pane display device of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device, comprising:

first and second substrates;

a gate line and a data line defining a pixel region on the first substrate;

a common line parallel to and spaced apart from the gate tine in a middle section of the pixel region;

a thin film transistor adjacent to a crossing portion of the gate and data lines, the thin film transistor having gate, source, and drain electrodes;

a first insulating layer on the gate line and common line;

a transparent common electrode on the first substrate and having a plurality of extended portions perpendicular to the common line;

a plurality of transparent pixel electrodes on the first substrate and having a plurality of extended portions perpendicular to the common line;

extended portions extending from the common line between a boundary of the pixel region and an outermost extended portion of the common electrode, wherein the extended portions extending from the common line are on a layer different from the common electrode;

a first storage electrode on the first insulating layer over the common line;

a second storage electrode on the first insulating layer over the gate line, wherein the first and second storage electrodes are connected to the drain electrode by extended lines on a layer different than the pixel electrodes;

and a liquid crystal layer between the first and second substrates, wherein the plurality of extended portions of the pixel electrodes have an alternating pattern with the plurality of extended portions of the common electrode.

2. The device of claim 1, wherein the common electrode is connected to the common line.

3. The device of claim 1, wherein the gate and data lines have the same material.

4. The device of claim 1, wherein the common and pixel electrodes include one of indium-tin-oxide or indium-zinc-oxide.

5. The device of claim 1, wherein the common electrode has a substantially zigzag shape.

6. The device of claim 1, wherein the pixel electrode has a substantially zigzag shape.

7. The device of claim 1, wherein the pixel region is divided by the common line.

8. The device of claim 1, wherein the second storage electrode is connected to the pixel electrode.

9. The device of claim 8, wherein the second storage electrode is connected to the drain electrode.

10. The device of claim 1, wherein the extended portions are substantially perpendicular to the common line.

11. The device of claim 1, further comprising a transverse common electrode over the common line.

12. The device of claim 11, wherein the transverse common electrode contacts the common line through at least one contact hole.

13. The device of claim 11, wherein the first storage electrode is between the common line and the transverse common electrode.

* * * * *